United States Patent [19]

Falk

[11] Patent Number: 4,950,995
[45] Date of Patent: Aug. 21, 1990

[54] METHOD OF TREATING A WELL BORE IN CONNECTION WITH ELECTRIC LOGGING OF SUBSURFACE FORMATION

[75] Inventor: David O. Falk, Denver, Colo.

[73] Assignee: Marathon Oil Company, Findlay, Ohio

[21] Appl. No.: 332,255

[22] Filed: Mar. 31, 1989

[51] Int. Cl.$^5$ .................. G01V 3/18; E21B 43/27; E21B 47/00

[52] U.S. Cl. .................... 324/323; 166/250; 166/300

[58] Field of Search ............... 324/323, 324, 325, 351, 324/355, 366, 367; 73/153; 166/250, 294, 295, 300

[56] References Cited

U.S. PATENT DOCUMENTS

| | | | |
|---|---|---|---|
| 3,938,594 | 2/1976 | Rhudy et al. | 166/308 |
| 4,199,680 | 4/1980 | Moon | 166/250 X |
| 4,210,206 | 7/1980 | Ely et al. | 166/294 |
| 4,461,351 | 7/1984 | Falk | 166/300 X |
| 4,473,119 | 9/1984 | Falk | 166/300 X |
| 4,498,539 | 2/1985 | Bruning | 166/300 X |
| 4,536,297 | 7/1985 | Loftin et al. | 252/8.5 |
| 4,594,170 | 6/1986 | Brown et al. | 166/300 X |
| 4,614,250 | 9/1986 | Panetta et al. | 324/367 X |
| 4,647,859 | 3/1987 | Son et al. | 324/323 |

Primary Examiner—Reinhard J. Eisenzopf
Assistant Examiner—Warren S. Edmonds
Attorney, Agent, or Firm—Jack L. Hummel

[57] ABSTRACT

A method of preventing flow of formation fluid and crude oil into a well bore during an electric resistivity logging operation. A readily flowable liquid gellation composition containing a breaker is of contrasting resistivity to that of the formation water. Fluids in the well bore are displaced by the liquid composition and the composition is allowed to gel. The gel may be of a highly viscous, moderately flowable state, which prevents ingress of formation fluids and crude oil but permits logging equipment to be moved therethrough. Alternatively, the gel in the well bore may be removed while leaving the gel in the adjoining formation in place, and the removed gel replaced with fresh water prior to the logging operation. After effecting the log a breaker in the gel composition causes the gel to revert to a liquid, which is removed from the well bore.

10 Claims, 2 Drawing Sheets

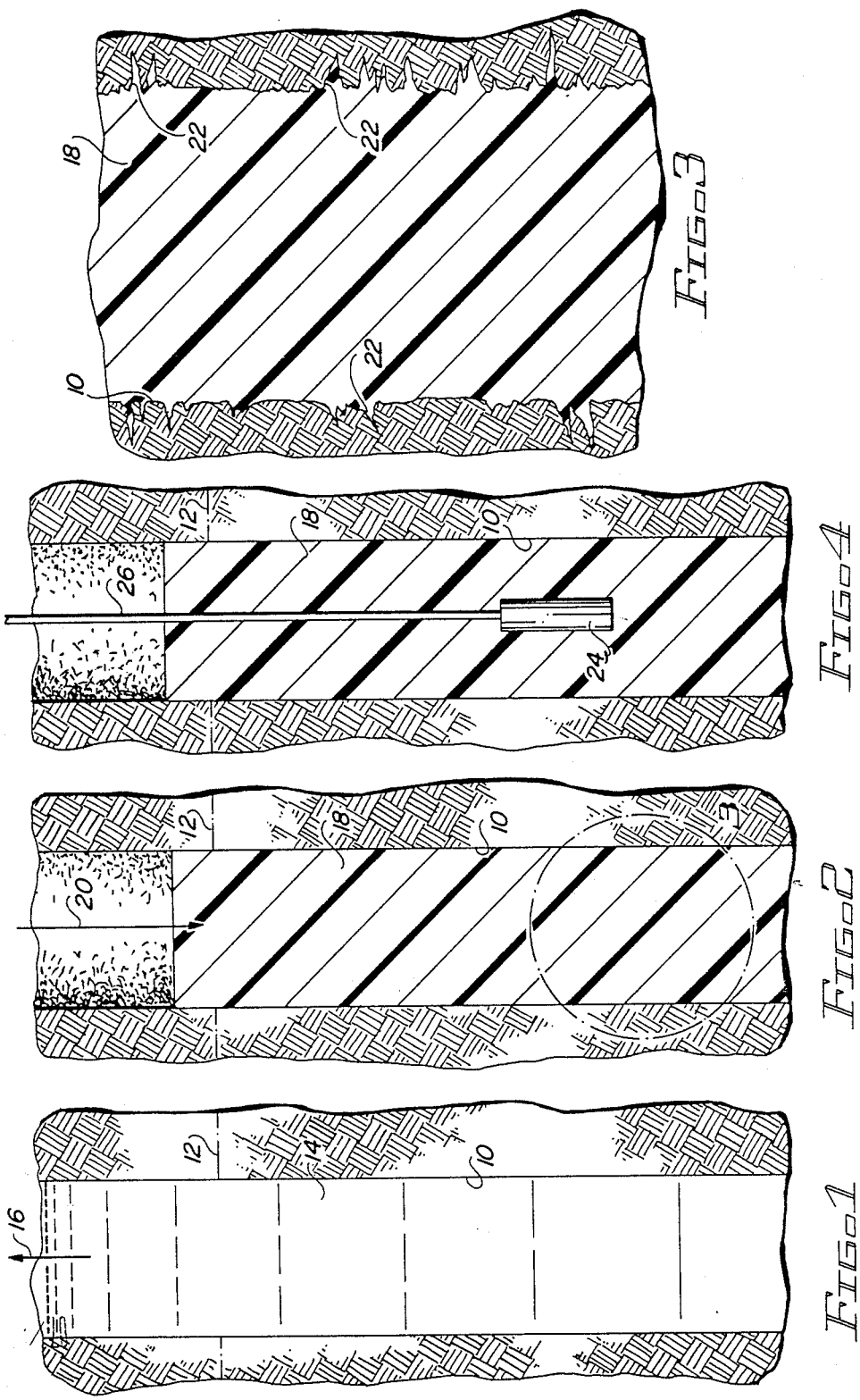

METHOD OF TREATING A WELL BORE IN CONNECTION WITH ELECTRIC LOGGING OF SUBSURFACE FORMATION

FIELD OF THE INVENTION

This invention relates to a method for carrying out electric logging in a well bore. More particularly, it relates to a method for treating the well bore prior to the logging operation in order to optimize the conditions under which the logging takes place.

BACKGROUND OF THE INVENTION

In the drilling of an oil well it is desirable to learn as much as possible about the nature of the various formations penetrated by the well bore. To this end detailed records or logs of the formations encountered during the drilling of the well bore are kept. Such logs normally include observations and data from core samples as well as data generated by indirect means, including density logs, sonic logs and electric logs.

In electric logging, equipment which includes an electrical sensing device is moved through the bore hole and provides indications of the electrical resistivity or conductivity of the subsurface materials encountered at different depths. In resistivity logging variations in potential resulting from an electric current driven through the formation by the logging equipment are measured and recorded. The resistivity measurement thus responds primarily to conductive fluids contained in the formation.

Drilling and completion fluids very often are comprised of compositions which are not conducive to accurate electric logging. For example, drilling fluids may contain potassium chloride as a deterrent to the swelling of clay and the sloughing of formation materials into the fluid. High chloride ion levels in the drilling fluids interfere with the accurate interpretation of electric logs because they create a conductive medium in the fluid surrounding the logging equipment, thus hampering the investigation of the adjacent formations. Ideally, the logging apparatus should operate in a nonconductive medium so that there is a distinct resistivity contrast between the saline formation water and the logging medium.

As a means of overcoming the problem of electric logging in unsuitable drilling or completion fluids, compositions have been developed which are intended to be insensitive to salt water intrusion and to have a high tolerance for contamination from cement and other solids. These fluids, when used as drilling or completion fluids, are supposed to minimize the effect of ion-containing solutions in the formation.

Such fluids do not satisfactorily remedy the logging problem. They are relatively costly and, rather than creating an environment which does not contain the fluids or solids which interfere with accurate electric logging, they merely attempt to neutralize their effect. Further, they do not prevent the migration of crude oil into the well bore, which also tends to interfere with accurate data gathering.

It would be preferable to be able to eliminate unwanted fluids and solids from the well bore for an electric logging operation rather than to attempt to merely neutralize or counteract them. This would enable less expensive drilling and completion fluids to be utilized and would result in more accurate log data.

SUMMARY OF THE INVENTION

In carrying out the method of the invention fluid in the well bore to be logged is displaced with a readily flowable liquid composition of relatively low viscosity. The liquid composition is designed to gel to the state of a relatively slow flowing liquid of relatively high viscosity. The logging operation is then carried out in the relatively highly viscosity gel, after which the gel is caused to revert to its readily flowable low viscosity form and is removed from the well bore. By displacing the well bore fluid, ingredients such as residual oil, drilling mud and solutions containing high levels of chloride ion, all of which interfere with the gathering of accurate data through electric logging, are no longer present during the logging operation and resistivity measurements more faithfully represent true readings. Further, the use of a highly viscous fluid which permits logging equipment to be moved through it and which can be maintained under adequate pressure, prevents formation fluid from flowing into the well bore and contaminating the electric log readings.

To assure that the gel has a sufficiently different resistivity than the formation water, it is formed from water which has a sufficiently different resistivity. Further, the gel may contain a breaker to cause the gel to revert to its readily flowable, relatively low viscosity form after the logging operation has been completed. This permits the gel to be easily removed from the well bore.

In another aspect of the invention, instead of running the logging tool through viscous gel, the gel which has not penetrated the cracks and fissures in the adjacent formation may be removed and replaced by fresh water. The logging tool may then be moved through the water and logging readings taken. Subsequently, the gel in the adjacent formation would be broken and the resulting liquid removed from the well bore.

BRIEF DESCRIPTION OF THE DRAWINGS

FIG. 1 is a schematic longitudinal sectional view of a well bore containing fluids which are not conducive to accurate electric logging;

FIG. 2 is a schematic view similar to that of FIG. 1, but wherein the fluids previously in the well bore have been replaced with a liquid composition capable of gelling to the state of a relatively slow flowing liquid of relatively high viscosity;

FIG. 3 is an enlarged view of the area within the circle 3 in FIG. 2;

FIG. 4 is a schematic view similar to that of FIG. 2, showing the logging device in place;

DESCRIPTION OF THE PREFERRED EMBODIMENT

Figure 7:
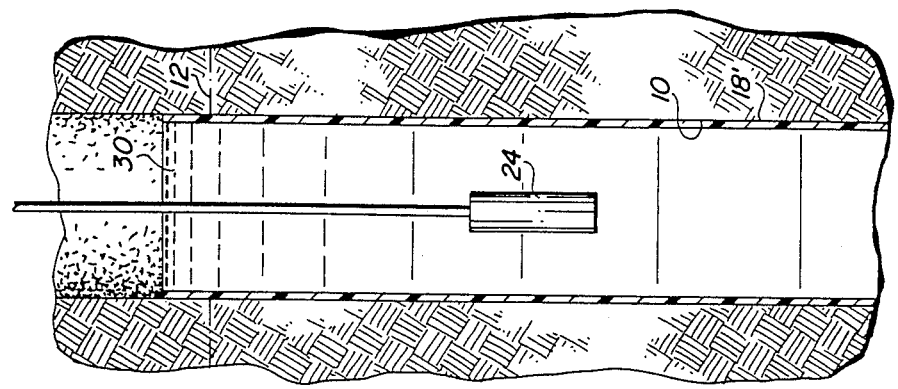
FIG. 7 is a view similar to that of FIG. 6, showing the logging device in place.

Referring to FIG. 1, a well bore 10 is schematically illustrated as penetrating a subsurface formation for which it is desired to obtain an electric log, the upper boundary of the formation being indicated at 12. The well bore contains fluid 14 which typically is a combination of drilling fluid and formation fluid. Crude oil from the formation is often capable of flowing into the well bore, and the surface of the formation comprising the wall of the well bore often retains drilling mud from the drilling operation. These various items contain ingredients which are not conducive to accurate electric logging. Instead of employing specialized drilling fluid in an attempt to neutralize the effects of the ingredients, in accordance with the invention the well bore fluid 14 is removed from the well bore 10, as indicated by the arrow 16 in FIG. 1. It is replaced, as shown in FIG. 2, by a liquid composition 18 introduced into the well bore 10 as indicated by the arrow 20. The liquid composition 18 may be pumped in or introduced through tubing extending below the formation which it is desired to log. In any event the fluid replaced by the gel is purged from the well bore, carrying with it residual drilling mud which had adhered to the formation surface in this segment of the well bore.

The liquid composition conveniently would be mixed on the surface and introduced while still of relatively low viscosity. In this state, as shown in FIG. 3, it not only fills the well bore 10 but, due to pressure applied by the weight of the fluid column above it, the liquid composition flows into the fissures, cracks and cavities 22 of the formation which have been intersected by the well bore 10. In a relatively short time, which may be controlled and governed by the proper formulation, the liquid composition gels to a state of greater viscosity. The presence of a flowable high viscosity gel in the various types of openings 22 in the formation of the wall of the well bore 10 prevents formation fluid or crude oil from flowing into the well bore, thus eliminating contamination of the liquid gel 18 and the logging tool.

Any suitable liquid composition of a viscosity that can be pumped and which subsequently gels to a greater viscosity capable of preventing entry of formation fluids and crude oil can be used. In addition, the gel should be capable of breaking down and reverting to a liquid of relatively low viscosity to permit subsequent removal of the gel from the well bore.

Gels of particular interest are gels comprised of a carboxylate-containing polymer crosslinked with a crosslinking agent comprising a chromic carboxylate complex. The carboxylate-containing polymer may be any crosslinkable, high molecular weight, water soluble, synthetic polymer or biopolymer containing one or more carboxylate species. The average molecular weight of the carboxylate-containing polymer is in the range of about 10,000 to about 50,000,000, with the preferred range being about 100,000 to about 20,000,000.

The biopolymers which can be used include polysaccharides and modified polysaccharides. Exemplary biopolymers are guar gum and carboxymethylcellulose. Examplary synthetic polymers include acrylamide polymers, such as polyacrylamide, partially hydrolyzed polyacrylamide and terpolymers containing acrylamide, acrylate and a third species. As defined herein, polyacrylamide (PA) is an acrylamide polymer having substantially less than 1% of the acrylamide groups in the form of carboxylate groups. Partially hydrolyzed polyacrylamide (PHPA) is an acrylamide polymer having at least 1%, but not 100%, of the acrylamide groups in the form of carboxylate groups. The acrylamide polymer may be prepared according to any of the well known conventional methods in the art. The preferred carboxylate-containing polymer is polyacrylamide or partially hydrolyzed polyacrylamide.

With respect to the chromic carboxylate complex crosslinking agent, the term "complex" means an ion or molecule containing two or more interassociated ionic, radical or molecular species. A complex ion as a whole has a distinct electrical charge while a complex molecule is electrically neutral. The term "chromic carboxylate complex" encompasses a single complex, mixtures of complexes containing the same carboxylate species, and mixtures of complexes containing differing carboxylate species.

The complex useful as a crosslinking agent includes at least one or more electropositive chromium III species and one or more electronegative carboxylate species. Each complex optionally contains additional species which are not essential to the polymer crosslinking function of the complex, such as one or more water molecules or inorganic monovalent or divalent ions which function merely to balance the electrical charge of the complex.

Trivalent chromium and chromic ion are equivalent terms encompased by the term "chromium III species" as used herein. The carboxylate species are advantageously derived from water soluble salts of carboxylic acids, especially low molecular weight mono-basic acids. Carboxylate species derived from salts of formic, acetic, propionic and lactic acid, lower substituted derivatives thereof and mixtures thereof are preferred. The carboxylate species include formate, acetate, propianate, lactate, lower substituted derivatives thereof and mixtures thereof, all of which are water soluble. The optional organic ions include sodium, sulfate, nitrate and chloride ions.

The complexes described and their method of preparation are well known in the art. The preferred chromic carboxylate complex for use in this invention is chromic acetate complex.

A preferred gel suitable for use in the invention is one of polyacrylamide or partially hydrolyzed polyacrylamide crosslinked with chromic triacetate. As is well known in the art, these gels can be readily formulated as a low viscosity fluid having a broad range of strengths and gel onset times. For example, 2% polyacrylamide (PA) with chromic triacetate (CrAc) in a ratio of 20 PA:CrAc results in a suitable gel which can be readily controlled by methods well known in the art as to the gel onset time and the degree of gel attained. By adding a breaker to the gel composition the gel will break down within a predetermined period of time, reverting to a nonviscous fluid. For example, ammonium persulfate and sodium nitrite, when incorporated in the gel composition in amounts from 1000 to 8000 ppm, broke gels between 20 and 30 days at 75° F.

As is known in the art, a number of different types of breakers may be used in connection with a polyacrylamide-chromic triacetate gel system. In addition to the oxidizing agents mentioned, a number of other oxidizing agents such as sodium persulfate, sodium chlorate, sodium perchlorate and sodium perborate may be used. Other types of breakers which can be employed with the gel system include strong chemical breakers, such as hydrogen peroxide, sodium chlorite, perchloric acid and sodium peroxide; chelating agents, such as oxalic acid, citric acid, sodium tartrate and sodium citrate; and organic chemicals such as methylacetoacetate, ethylacetate, ethylacetoacetate and dichloroacetic acid.

Since the electric logging equipment must be able to be moved through the gel in the well bore, the gel should preferably be a moderately flowing gel. In the test used to determine the flowability rating of a gel, a 4-ounce widemouth bottle containing 50 cc of the gel is inverted and the type of flow observed. For example, a highly flowing gel would receive a B rating, a flow wherein most of the gel flows to the bottle cap upon inversion would receive a C rating, a flow wherein a small portion of the gel does not readily flow to the bottle cap would receive a D rating, and a flow wherein the gel can barely flow to the bottle cap or wherein at least 15% of the gel does not flow would receive an E rating. Gels with higher ratings would not be flowing gels and so would not permit electric logging equipment to travel through the gel-filled well bore. Although D gels are preferred from the standpoint of the best compromise between the ability to prevent flow from the formation into the well bore and the ability to permit travel of electric logging equipment through the well bore, gels rated as C and E could also be used. Depending on the gel onset time and the time required to purge the well bore of the unwanted drilling fluid, the liquid composition may be introduced into the well bore almost immediately after mixing or may be allowed to gel somewhat before being introduced. The time of introduction would thus be somewhere between the time of mixing the gel ingredients, which initially produces a liquid somewhat more viscous than water, and 24 hours after the time of mixing, which typically is the time required for full gelation to take place for a gel of the type used in this invention.

By adding a breaker to the gel composition the gel will break down within a predetermined period of time, reverting to a less viscous fluid. As is known in the art, a number of different types of breakers may be used in connection with a polyacrylamide-chromic triacetate gel system. Hydrogen peroxide, for example, used in amounts of 1000 ppm, resulted in C grade gels which were broken within a day or so, giving ample time for the logging operation to take place. Oxidizing agents such as ammonium persulfate, sodium nitrite, sodium persulfate, sodium chlorate, sodium perchlorate and sodium perborate may be used. Other types of breakers which can be employed with the gel system include other strong chemical breakers, such as sodium chlorite, perchloric acid and sodium peroxide; chelating agents, such as oxalic acid, citric acid, sodium tartrate and sodium citrate; and organic chemicals such as methylacetoacetate, ethylacetate, ethylacetoacetate and dichloroacetic acid.

Those skilled in the art of gelation will recognize that other gel systems and associated breakers in addition to those mentioned may be utilized to fill the well bore 10 to the desired level and to subsequently revert to less viscous form.

To permit the logging equipment to detect variations in potential in the formation of interest, the gel must have a sufficiently different resistivity than that of the formation water. Since the resistivity of a gel is a direct function of its salinity, the gel should be made with fresh water. Thus in the case of electric resistivity logging, where the formation water is saline, the gel made with fresh water produces the significant resistivity contrast required, resulting in good resistivity logging results.

Referring now to FIG. 4, once the gel 18 has thickened to the degree necessary to prevent ingress of formation fluid and crude oil into the well bore 10, logging equipment 24 suspended on a line 26 is run through the well bore 10 in the area to be logged. Even though the gel 18 may be quite viscous, that is, one which is barely flowable, the logging equipment 24 is still able to readily move through it. Because of the satisfactory contrast in resistivity between the gel and the formation water, resistivity readings will be accurately made.

Figure 5:
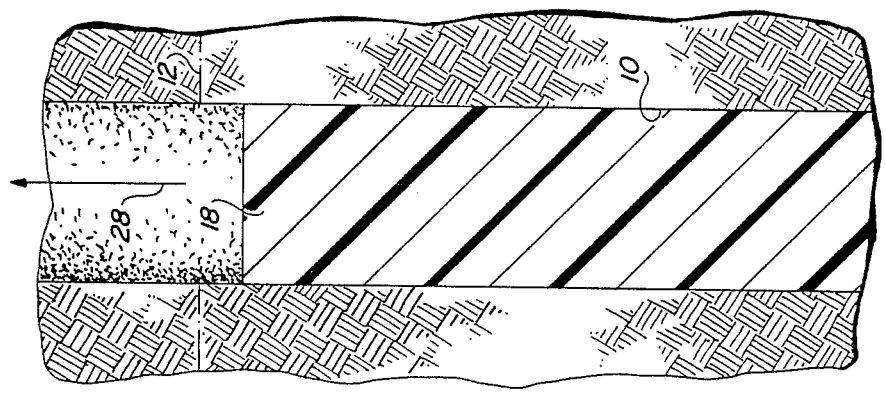
FIG. 5 is a schematic view similar to that of FIG. 2, after the logging operation has taken place.

A suitable time after the logging is completed the gel will be broken to its less viscous form and the resulting fluid or broken gel will be removed. This is schematically shown in FIG. 5 by the directional arrow 28. The step of removing the broken gel may be accomplished by suitable convenient means such as by pumping the fluid to the surface or purging it with water or other fluid introduced from tubing which has been lowered to a point beneath the broken gel.

In another aspect of the invention, instead of running the logging equipment through viscous gel, after the gel has set up in the well bore sufficiently to permit suitable mechanical means to remove it, the gel may be removed and replaced with fresh water. In other words, at the stage illustrated in FIG. 2, wherein the well bore has been filled with gel, the gel may be removed by a drilling operation, leaving in place the gel which has penetrated the cracks and fissures of the adjacent formation. Obviously, if such an operation is employed the viscosity of the gel need not be similar to the viscosity of the gel in the first embodiment. It may instead be hard and nonflowable, as long as its physical state permits its removal by known suitable means.

Figure 6:
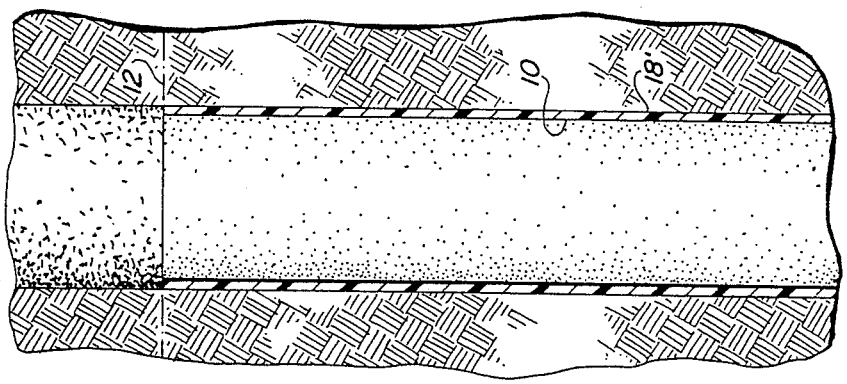
FIG. 6 is a schematic longitudinal sectional view of a well bore illustrating another embodiment of the invention wherein gel has been removed from the well bore prior to conducting an electric logging operation.

The condition of the well bore at this stage is schematically shown in FIG. 6, wherein the gel 18' represents the gel in the adjacent cracks and fissures after the main core of the gel has been removed. After adding fresh water 30, as shown in FIG. 7, the logging equipment 24 can then be readily moved through the low viscosity fluid and accurate logging readings taken. It will be understood that the gel 18' remaining in the formation adjacent the well bore prevents crude oil and saline formation water from flowing into the well bore and causing logging problems. As in the first embodiment, after the logging operation has been completed the gel 18' would be removed after reverting to liquid form.

It will now be appreciated that the method of the present invention results in superior logging results without the need for utilizing specialized more costly drilling fluids. The steps of the method are simple yet highly effective, acting to purge the well bore of undesirable fluid, mud and oil and to replace it with a composition which prevents the entry of crude oil from the formation.

It should now be understood that the invention is not necessarily limited to all the specific details described in connection with the preferred embodiment, but that changes to certain features of the preferred method which do not affect the overall basic function and concept of the invention may be made by those skilled in the art without departing from the spirit and scope of the invention, as defined in the appended claims.

What is claimed is:

1. A method of treating a well bore in connection with the electric logging of a subsurface formation penetrated by the well bore, comprising the steps of:
   displacing fluid in the portion of the well bore penetrating the subsurface formation with a readily flowable liquid composition of relatively low viscosity, the liquid composition being capable of gelling to a highly viscous moderately flowing state;

causing some of the liquid composition to enter the formation immediately adjoining said portion of the well bore;

allowing the liquid composition to gel to the extent whereby the gel in the adjoining formation prevents entry of crude oil and formation water into the well bore and the gel in the well bore permits electric logging equipment to be moved therethrough;

logging the subsurface formation with electric logging equipment moved through the gel;

causing the gel to revert to readily flowable liquid form; and removing the readily flowable liquid from the well bore.

2. A method according to claim 1, wherein the gel has a sufficiently contrasting resistivity to that of the formation water to permit the logging equipment to provide adequate logging results.

3. A method according to claim 2, wherein the liquid composition is an aqueous solution comprised of fresh water.

4. A method according to claim 1, wherein the liquid composition used to form the gel contains a breaker, causing the relatively high viscosity gel to revert to a readily flowable, relatively low viscosity liquid composition after a predetermined period of time.

5. A method according to claim 4, wherein the gel is comprised of a carboxylate-containing polymer crosslinked with a chromic carboxylate complex crosslinking agent.

6. A method according to claim 5, wherein the polymer is an acrylamide polymer.

7. A method according to claim 6, wherein the polymer is selected from the group consisting of polyacrylamide and partially hydrolyzed polyacrylamide and the crosslinking agent comprises a chromic acetate complex.

8. In a method of treating a well bore in connection with the electric logging of a subsurface formation penetrated by the well bore, the steps of:

forming an aqueous readily flowable liquid composition capable of gelling to a highly viscous, moderately flowing state, the composition comprising water of contrasting resistivity to the resistivity of the formation water;

introducing the liquid composition into the portion of the well bore in the subsurface formation so that the liquid composition displaces drilling mud and other liquids in said portion of the well bore and enters the adjoining formation to a limited extent;

allowing the liquid composition to gel to a state whereby the gel in the adjoining formation prevents entry of crude oil and formation water into the well bore and the gel in the well bore permits electric logging equipment to be moved therethrough;

logging the subsurface formation with electric logging equipment in said portion of the well bore;

causing the gel to revert to a liquid of lower viscosity by including a breaker in the gel; and removing said liquid from said portion of the well bore.

9. A method of treating a well bore in connection with the electric logging of a subsurface formation penetrated by the well bore, the steps of:

forming an aqueous readily flowable liquid composition capable of gelling, the composition comprising water of contrasting resistivity to the resistivity of the formation water;

introducing the liquid composition into the portion of the well bore in the subsurface formation so that the liquid composition displaces drilling mud and other liquids in said portion of the well bore and enters the adjoining formation to a limited extent;

allowing the liquid composition to gel;

removing the gel from the well bore while leaving the gel in the adjoining formation in place;

introducing fresh water into the well bore;

logging the subsurface formation with electric logging equipment in said portion of the well bore;

causing the gel in the adjoining formation to revert to a liquid of lower viscosity by including a breaker in the gel; and removing said liquid from said portion of the well bore.

10. A method of treating a well bore in connection with the electric logging of a subsurface formation penetrated by the well bore, comprising the steps of:

displacing fluid in the portion of the well bore penetrating the subsurface formation with a readily flowable liquid composition of relatively low viscosity, the liquid composition being capable of gelling;

causing some of the liquid composition to enter the formation immediately adjoining said portion of the well bore;

allowing the liquid composition to gel, whereby the gel in the adjoining formation prevents entry of crude oil and formation water into the well bore;

removing the gel from the well bore while leaving the gel in the adjoining formation in place;

replacing the removed gel with fresh water;

logging the subsurface formation with electric logging equipment moving through the fresh water in the well bore;

causing the gel in the adjoining formation to revert to a readily flowable liquid; and removing the readily flowable liquid from the well bore.

* * * * *

UNITED STATES PATENT AND TRADEMARK OFFICE
CERTIFICATE OF CORRECTION

PATENT NO. : 4,950,995

DATED : August 21, 1990

INVENTOR(S) : David O. Falk

It is certified that error appears in the above-identified patent and that said Letters Patent is hereby corrected as shown below:

| | |
|---|---|
| Col. 2, line 9: | Delete "highly" and insert therefor --high--. |
| Col. 2, line 49: | After "circle 3" insert --shown--. |
| Col. 3, line 55: | Delete "Examplary" and insert therefor --Exemplary--. |
| Col. 4, line 21: | Delete "encompased" and insert therefor --encompassed--. |
| Col. 8, line 9: | Delete "A" and insert therefor -- In a--. |

Signed and Sealed this

Twenty-sixth Day of November, 1991

Attest:

HARRY F. MANBECK, JR.

*Attesting Officer*  *Commissioner of Patents and Trademarks*